(12) United States Patent
Ruehle et al.

(10) Patent No.: US 7,537,834 B2
(45) Date of Patent: May 26, 2009

(54) PARTICLE COMPOSITE HAVING IRREGULAR SURFACE, METHOD FOR THE PRODUCTION AND USE THEREOF

(75) Inventors: Thomas Ruehle, Weinheim (DE); Dirk Schubert, Leutershausen (DE); Juergen Henke, Viernheim (DE); Achim Gruber, Schoenau (DE); Gregor Grun, Weinheim (DE)

(73) Assignee: Carl Freudenberg KG, Weinheim (DE)

( * ) Notice: Subject to any disclaimer, the term of this patent is extended or adjusted under 35 U.S.C. 154(b) by 290 days.

(21) Appl. No.: 10/578,999

(22) PCT Filed: Sep. 25, 2004

(86) PCT No.: PCT/EP2004/010792

§ 371 (c)(1),
(2), (4) Date: May 11, 2006

(87) PCT Pub. No.: WO2005/049489

PCT Pub. Date: Jun. 2, 2005

(65) Prior Publication Data

US 2007/0087196 A1    Apr. 19, 2007

(30) Foreign Application Priority Data

Nov. 14, 2003  (DE) .................. 103 53 555

(51) Int. Cl.
*B32B 5/16* (2006.01)
*B05D 1/36* (2006.01)
*B05D 7/00* (2006.01)

(52) U.S. Cl. ............... 428/403; 428/404; 428/405; 427/201; 427/202; 427/203; 427/204; 427/205; 427/226; 427/255.11; 427/255.14; 427/261

(58) Field of Classification Search .......... 428/403, 428/404, 405; 427/201–205, 215, 255.1, 427/255.14, 226, 261
See application file for complete search history.

(56) References Cited

U.S. PATENT DOCUMENTS 5,184,779 A   2/1993  Wolff et al. ................ 241/3

(Continued)

FOREIGN PATENT DOCUMENTS

DE         25 44 218 A     4/1977

(Continued)

OTHER PUBLICATIONS

Brunauer, Stephan, P.H. Emmett and Edward Teller. "Adsorption of Gases in Multimolecular Layers." *Journal of Amer. Chem. Soc.* vol. 60 (Feb. 1938): 309-319.

(Continued)

*Primary Examiner*—H. (Holly) T Le
(74) *Attorney, Agent, or Firm*—Davidson, Davidson & Kappel, LLC

(57) ABSTRACT

A particle composite including carrier particles having an average diameter of less than 5 μm. The particle composite is surrounded by a layer made of oxidic material having an irregular surface. Particles, which are made of an active material and which have an average diameter of less than 1 μm are applied to the layer. The particle composite can be used as a filling substance in polymers and enables the content of active material for comparable properties to be reduced or improves the properties of filled materials, e.g. resistance to aging of elastomers.

30 Claims, 1 Drawing Sheet

U.S. PATENT DOCUMENTS

| | | | | |
|---|---|---|---|---|
| 5,510,156 | A | * | 4/1996 | Zhao .......................... 427/534 |
| 5,612,128 | A | * | 3/1997 | Endo et al. .................. 428/402 |
| 5,756,207 | A | * | 5/1998 | Clough et al. ............... 428/375 |
| 6,106,606 | A | * | 8/2000 | Gellermann et al. ........ 106/441 |
| 6,164,454 | A | | 12/2000 | Freund et al. ............... 206/706 |
| 6,534,176 | B2 | * | 3/2003 | Terase et al. ................ 428/403 |
| 6,660,680 | B1 | * | 12/2003 | Hampden-Smith et al. .. 502/180 |
| 6,770,367 | B1 | * | 8/2004 | Custodero et al. ........... 428/403 |
| 2004/0023040 | A1 | | 2/2004 | Gellermann et al. ........ 428/446 |

FOREIGN PATENT DOCUMENTS

| | | |
|---|---|---|
| DE | 100 41 038 | 3/2002 |
| EP | 475 046 A | 3/1992 |
| EP | 0 803 550 | 10/1997 |
| FR | 2 732 330 A | 3/1995 |

OTHER PUBLICATIONS

Prado-Burguete, C. et al. "Effect of Carbon Support and Mean Pt Particle Size on Hydrogen Chemisorption by Carbon-Supported Pt Catalysts." *Journal of Catalysis* 128 (1991) 397-404.

* cited by examiner

PARTICLE COMPOSITE HAVING IRREGULAR SURFACE, METHOD FOR THE PRODUCTION AND USE THEREOF

BACKGROUND INFORMATION

The present invention relates to ultrafine particles applied to selected carrier particles, a method for the production of the particle composite materials, and their use as fillers for polymers or as catalysts for cross-linkable polymers and as stabilizers in polymers.

When ultrafine particles are used in polymers, in particular in elastomers or thermoplastics, or in lubricating greases, the optimum distribution of the particles is very important in order to be able to exploit their potential as well as possible. This goal may only be implemented in exceptional cases through the introduction of mechanical energy.

Methods for producing ultrafine particles on ceramic and carbon-based carriers are known from the field of heterogeneous catalysis. As described in C. Prado-Burguete et al. in Journal of Catalysis 128 (1991) 397-404, for example, by impregnating carbon blacks with hexachloroplatinic acid and subsequent oxidation using oxygen and reduction using hydrogen, ultrafine platinum particles having 1 nm to 10 nm diameters may be obtained depending on the preparation and reaction conditions selected. Any prior activation of the carrier typically occurs here under a specific gas atmosphere at elevated temperatures.

A method for producing precipitated silicic acids, which may be used as fillers in elastomers, is described in U.S. Pat. No. 6,146,454. The precipitated silicic acids have a zinc content of 1 to 5 wt.-percent, are provided in spherical form, and are characterized by an array of further physical parameters. Spherical silica gels having mean diameters of more than 80 μm are used as the carrier materials. There are no further details in the patent about the location at which the zinc is located in these particles.

EP-A-475,046 describes a method for producing granulates made of zinc oxide and silicic acid, which are obtained through precipitation of zinc oxide and silicic acid. The granulates may be dispersed well in rubber mixtures.

A method for producing fillers containing zinc oxide is known from DE-A-25 44 218.

BRIEF SUMMARY OF THE INVENTION

The present invention is based on an object of providing a filler for polymers which, with comparable properties, has a significantly reduced content of active material, in particular a reduced heavy metal content.

A further object is providing a filler, through use of the aging behavior of polymers, in particular of elastomers, is drastically improved and using which a set of mechanical values may be achieved which is not reached even at a significantly increased degree of filling of classical additives.

Yet a further object is providing a carrier-bound catalyst for chemical reactions, whose activity with known carrier-bound catalysts is significantly increased.

A further object is providing methods for producing these carrier-bound catalysts, which are simple to perform and provide reproducible results.

The present invention relates to a particle composite made up of carrier particles of a mean diameter of less than 5 μm, which are enveloped by a layer made of oxidic material having an irregular surface, to which particles made of active material having a mean diameter of less than 1 μm are applied.

Furthermore, the present invention relates to a method for producing the particle composites defined above, which includes the following measures:

i) producing a layer of a precursor substance having silicon, aluminum, alkaline earth elements, and/or alkaline elements, containing at least one organic residue, on carrier particles with a mean diameter of less than 5 μm, ii) thermally decomposing the precursor substance on the coated carrier particles to produce a layer, which envelops the carrier particles, made of oxidic material having an irregular surface, and iii) applying particles made of active material having a mean diameter of less than 1 μm or precursors of these particles to the surface of the coated carrier particles, iv) if precursors of particles made of active material are applied to the surface of the coated carrier particles, the active particles being produced through thermal treatment of the particle composite.

Furthermore, the present invention relates to a method for producing the particle composites defined above, which includes the following measures:

i) producing a layer of a precursor substance having silicon, aluminum, alkaline earth elements, and/or alkaline elements, containing at least one organic residue, on carrier particles with a mean diameter of less than 5 μm, v) applying particles made of active material having a mean diameter of less than 1 μm or precursors of these particles to the surface of the carrier particles coated with precursor substance, and vi) thermally decomposing the precursor substance on the coated carrier particles to produce a layer, which envelops the carrier particles, made of oxidic material having an irregular surface, and possibly to produce particles made of active material having a mean diameter of less than 1 μm from the precursors of these particles.

Any arbitrary materials may be used as carrier particles for the particle composites according to the present invention. These may have any arbitrary form, for example, round, ellipsoidal, irregular, or fibrous. However, these are finely divided particles having a mean diameter of less than 5 μm, preferably from 0.1 μm to 1 μm (determined using electron microscopy). If fibers are used, it is sufficient if these have a mean diameter (median) of less than 5 μm in only one dimension.

The carrier particles may have been activated using chemical or physical methods, for example, through thermal, chemical, or mechanical types of treatment, such as tempering in the furnace, treatment with acids, or in the ball mill.

Typical materials from which the carrier particles are made are carbons or carbon compounds, such as carbon blacks, graphite, or chemically modified graphite; as well as oxidic materials, such as silicon oxide or metal oxides, e.g., aluminum oxide; or other thermally and mechanically resistant ceramic materials, such as silicon nitride, silicon carbide, or boron nitride; or metal carbonates, such as calcium carbonate, or metal sulfides or sulfates, such as calcium sulfate, barium sulfate, or iron sulfide. Finely divided ceramic bodies or organic polymer materials may also be used as carrier particles. The latter are to be selected in such a way that they withstand the temperature treatments during the production of the particle composites without significant degradation or decomposition.

Arbitrary compounds having silicon, aluminum, alkaline earth elements, or alkaline elements, which contain at least one organic residue, preferably an alkyl residue, which may be partially or completely halogenated, may be used as the precursor substances for producing a layer made of oxidic material having an irregular surface which envelops the carrier particles.

Examples of precursor substances are silanes or silicon-halogen compounds, which contain at least one organic residue, such as aliphatic residues, including the ethylene unsaturated aliphatic residues, aromatic residues, and/or carboxyl residues, or aluminum-organic compounds, such as trialkyl aluminum, dialkyl aluminum halides, or alkyl aluminum dihalides; or alkaline earth-organic compounds, such as dialkyl calcium or alkyl calcium chloride; or alkaline-organic compounds, such as alkyl lithium, alkyl sodium, or alkyl potassium, organic sandwich compounds (metallocenes), or metal carbonyls.

Through targeted thermal aging, a layer made of oxidic material may be produced from the precursor substances, which is distinguished by a strong fissuring of the surface. In addition to an irregular surface of the carrier particles, which may possibly already be provided, this results in an enlargement of the surface of the particles. This is expressed in an enlargement of the specific surface area after the thermal treatment of the carrier particles coated with precursor substance.

Typically, the specific surface area (ascertained according to the BET method) may be enlarged by the thermal treatment by at least 10%, preferably by at least 25%. Without being bound to theoretical considerations, it is assumed that due to the decomposition of the organic residues of the precursor substance(s) in the outer layer, pores and/or sinks arise, on and/or in which the ultrafine particles made of active material accumulate. Because these particles are situated on the surface, it is possible to lower their content and still obtain the desired effects, such as catalytic or stabilizing properties.

"Irregular surface" is understood in the framework of this description as a surface which deviates from the form of an ideal spherical surface or the ideal surface of another rotationally-symmetrical shape. Without being bound to theoretical considerations, this may be clarified on the basis of the following model. If a number of small hemispheres having a radius which is significantly smaller than the radius of the large sphere is generated on a regular spherical surface, so that a surface similar to a golf ball results, the surface may be increased theoretically by at least 1.8 times at a constant radius of the sphere.

The surfaces produced according to the present invention may be strongly fissured, i.e., they have pores and/or sinks which arise due to the shrinkage of the thermally labile precursor substance (calcination).

Particles made of any arbitrary materials may be used as the particles made of active material which are adsorbed or fixed in another way on the surface of the particle composites according to the present invention. These may have any arbitrary form, such as round, ellipsoidal, or irregular. However, they are finely divided particles having a mean diameter of less than 1 μm, determined with the aid of electron microscopy and the BET method, preferably from 0.01 μm to 0.5 μm. The particles made of active material in the particle composite according to the present invention are significantly smaller than the particular carrier particles. The ratio of the mean diameter of particles made of active material to the mean diameter of the carrier particle is typically less than 1:10, preferably 1:10 to 1:1000.

It is assumed that the particles made of active material may be intercalated in the pores or sinks of the fissured surface, so that they are freely accessible from the surroundings of the particle composite.

All materials, using which a desired property of a substrate may be influenced, are usable as active materials.

The active material is typically a metal, including the metal alloys, a semiconductor, and/or compounds of these materials, in particular chalcogenides, nitrides, or carbides of metals.

Metals or semiconductors are preferred, in particular magnesium, calcium, barium, titanium, manganese, iron, copper, zinc, silver, gold, platinum, zirconium, yttrium, aluminum, silicon, and tin.

Metal oxides, in particular zinc oxide, are also preferred.

Particle composites in which the carrier particles have a mean diameter of 0.1 μm to 1.0 μm ($D_{50}$) and in which the particles made of active material have a mean diameter of 1 nm to 1000 nm ($D_{50}$), with the proviso that the ratio of the mean diameter of the carrier particles to the mean diameter of the particles made of active material is less than 1:0.5, preferably between 1:0.01 and 1:0.1, are especially preferred.

The particle composites according to the present invention may be produced according to the method described above.

According to the present invention, the carrier material may be coated with a suitable thermolabile substance. The layer made of the thermolabile substance is then thermally treated, so that through decomposition of this thermolabile substance while obtaining the layer, the surface of the coated carrier is enlarged and the ultrafine particles made of active material are then applied to the enlarged surface.

Instead of this procedure, the carrier material may be coated with a suitable thermolabile substance and ultrafine particles or suitable precursor substances for ultrafine particles are then applied in a suitable way to the surface of the coating. This is followed by a thermal treatment to decompose the thermolabile substance while obtaining the layer to enlarge the surface and to produce the active phase from the adsorbed precursor substances.

The materials described above may be selected as carrier materials. These carrier materials must be provided in fine distribution; i.e., the mean particle size (ascertained using raster electron microscopy ("REM")) must be less than 5 μm.

The materials described above may be selected as the thermolabile substances. Carrier materials and thermolabile substances are to be selected in the individual case in such a way that the dimensions of the carrier material do not change or change less than 5% at the required temperature of the thermal treatment.

The thermolabile substances may be applied using methods known per se to the surface of the carrier material. Examples of these methods are the impregnation of the surface of the carrier material with the thermolabile substance or a mixture of thermolabile substances or the direct application of thermolabile substances to the carrier material through simple mixing of both components. The thickness of the resulting layer may be set in a known way via the concentration in the impregnation solution or impregnation suspension or emulsion. Typical layer thicknesses of the layer made of thermolabile substance on the carrier material are in the range from 10 nm to 1000 nm, preferably 2 nm to 100 nm.

The layer may be formed through equilibrium adsorption. In this case, the carrier materials are suspended in a solution, suspension, or emulsion of thermolabile substances and the loading of the carrier materials is controlled via the concentration offered, whose optimum is ascertained from an adsorption isotherm, for example.

A further layer formation method is the "incipient wetness" method. A pasty mass is produced from the carrier material together with the solution, suspension, or emulsion of the precursor substance of the active phase and the thermolabile substance. The loading may be controlled via the quantity of the thermolabile substance contained in the solution, suspension, or emulsion and may be increased if necessary through multiple repetitions.

The coated carrier material subsequently may be dried in air. Typical drying times are at least six hours, preferably at least twelve hours. The drying temperature is selected as between 50° C. and 150° C. depending on the thermal resistance of the adsorbed substance.

The thermolabile substance may be adsorbed on the surface of the carrier material or may also be covalently bonded to the surface, for example, by using alkyl silicon halogen compounds.

The thermolabile substance may advantageously be applied by impregnating the carrier material with a solution in an organic solvent or preferably in water.

The thermal treatment is typically performed in air or under an artificial oxygen-containing atmosphere. The treatment duration is to be selected as sufficiently long to produce the enlarged surface phase from the adsorbed thermolabile substances. Typical treatment durations are more than six hours, preferably more than twelve hours, in particular twelve to twenty-four hours. The temperature is selected depending on the type of thermolabile material and atmosphere used. The temperature is to be selected in such a way that at least partial decomposition of the thermolabile substance occurs due to the treatment. The organic residues typically decompose and cavities and fissures are formed in the surface of the layer made of thermolabile material. Simultaneously, the material of this layer is oxidized. The layer thus changes but remains as a layer. Typical treatment temperatures are in the range from 150° C. to 500° C.

The progress of the enlargement of the surface may be tracked by determining the specific surface area of the coated material through methods known per se. An example of such a method is the determination according to BET (Journ. Americ. Chem. Soc., Vol. 60, 309, February 1938).

Surprisingly, the surface is not reduced by the thermal treatment, but rather enlarged. It is assumed that the effect of equalizing the particle surface caused by the thermal treatment is overcompensated for by the partial decomposition of the thermolabile substance.

After the thermal treatment of the layer made of thermolabile substance or alternatively after the application of this layer to the carrier material and before the thermal treatment of the layer made of thermolabile material, the coated carrier material may be treated with ultrafine particles and/or precursor substances for ultrafine particles. These are fixed on the surface of the layer made of thermolabile substance or made of the layer which is already thermally treated.

The substances described above or their precursors may be selected as the active materials. Carrier materials, thermolabile substances, and active materials or their precursors may be selected in the individual case in such a way that the dimensions of the carrier material and the active material do not change or change less than 5% at the required temperature of the thermal treatment and that the thermolabile substance and the precursor of the active material change at the temperature of the thermal treatment. The active phase may be produced either simultaneously with the decomposition of the thermolabile substance or after its decomposition.

The active materials or their precursors may also be applied to the surface of the coated carrier material through methods known per se. Examples of these are the methods already described in the description of the application of the thermolabile substance to the surface of the carrier material, i.e., direct application or impregnation.

Here as well, the impregnation may be performed through application from solution, suspension, or emulsion or through the "incipient wetness" method.

Examples of impregnation solutions containing precursors of particles made of active materials are 0.1 molar to saturated metal salt solutions, such as zinc, magnesium, titanium, calcium, iron, and/or barium salt solutions, hydroxides, carbonates, carboxylic acid salts, chlorides, sulfates, acetyl acetonates, and/or nitrates preferably being used as salts. The pH value of the impregnation solution is tailored to the particular coated carrier particles used in such a way that the adsorption of the precursor substance on the coated carrier particles is optimized.

The quantity of applied material may be set via the concentration in the impregnation solution or impregnation suspension and/or emulsion. In this case, typically less material is applied than in the case of the thermolabile substance. The formation of a layer of active material is not necessary, since the ultrafine particles made of active material are to be deposited in the irregularities of the surface of the coated carrier material.

The quantity of active material is typically selected in such a way that particle composites having a loading of 1 to 50 wt.-percent active material result.

The active material may already be applied in the desired particle form and distribution to the surface of the layer made of thermolabile material or to the already thermally treated surface of the coated carrier material, or the ultrafine particles made of active material may be produced on this surface through thermal treatment.

Treatment duration, composition of the treatment atmosphere, and treatment temperatures are to be selected in such a way that the desired active material results from the appropriate precursors. The adsorbed molecules begin to become mobile and agglomerate on the surface at sufficiently high temperatures. In this way, clusters which become larger and larger arise, which finally result in ultrafine particles.

The coated carrier material treated with active material and/or with its precursors is subsequently dried in air. Typical drying times are at least six hours, preferably at least twelve hours. The drying temperature selected is between 50° C. and 150° C. depending on the thermal resistance of the adsorbed substances.

The ultrafine particles made of active material are typically adsorbed on the surface of the coated carrier material, depending on the nature and pH of the carrier and the ultrafine particles via vander Waals interaction (physisorption), via ionic interaction (Coulomb interaction), or preferably via covalent bonds (chemisorption).

The precursor substances for ultrafine particles made of active material are typically also adsorbed on the surface of the coated carrier material. The desired ultrafine particles made of active material result from these precursors through thermal treatment. It is assumed that clusters made of active material form in this case, as was already described above. The occupation of the surface of the coated carrier material with active material may be controlled through the degree of loading with active phase.

The thermal treatment is typically performed, as in the decomposition of the thermolabile substance already described, in air or under an artificial oxygen-containing atmosphere. The treatment duration is to be selected as sufficiently long to produce ultrafine particles made of the desired material from the adsorbed precursors of active substances.

If the adsorbed substance is a precursor which must still be converted into the active phase, the material may be thermally treated, possibly under an appropriate gas atmosphere, at the decomposition temperature of the precursor. The reaction conditions are optimized by those skilled in the art on the basis of routine considerations, results from thermal analysis, preferably calorimetry and thermogravimetry, being used.

Typical treatment durations are more than six hours, preferably more than twelve hours, in particular twelve to twenty-four hours. The selection of the temperatures depends on the type of the precursor substance and the atmosphere used. The temperature is to be selected in such a way that ultrafine particles are formed from active substance by the treatment. The thermal treatment may be performed together with the step of at least partial decomposition of the thermolabile substance or also separately, i.e., after the decomposition of the thermolabile substance. Typical treatment temperatures move in the range from 200° C. to 500° C.

The size range of the particles made of active material produced from precursor substances may be controlled via the quantity of precursor substance applied to the surface of the coated carrier particles. Further method parameters are the temperature selected in the individual case and possibly the composition of the atmosphere provided during the treatment, e.g., its oxygen concentration and/or its content of water vapor.

Particles in the size range from 1 nm to 1 µm may be applied or produced on the surface through the method according to the present invention. The particles are adsorbed on the surface and anchored securely by the irregularities of the surface to the carrier lying underneath. Due to this secure fixing, the particles made of active material are not able to agglomerate, so that their surface is almost 100% accessible. The inaccessible volume component, which is located in the interior of the particles in typical carrier-bound materials, may thus be reduced to a minimum as a permanent development.

Materials produced in this way having a typical loading of 1 to 50 wt.-percent active phase may reduce the content and/or consumption of active material extraordinarily because of their extraordinarily fine distribution of the active phase down to diameters of 1 nm.

Carrier-bound particles of this type may be used as heterogeneous catalysts. An increased catalyst activity is to be expected here because of the increased surface area of the active phase, which is noticeable in comparison with catalysts of typical structure in an increased conversion in relation to a fixed quantity of catalyst.

Furthermore, the heavy metal content in polymers, in particular in elastomers, may be reduced by a factor of up to 10, the aging behavior may be drastically improved, even under the influence of temperature, and a set of mechanical values may be achieved which is not achieved even with a significantly elevated degree of filling of classical additives and is not possible with a thermolabile substance without a corresponding activation of the carrier.

The use of ultrafine functional fillers in polymers is primarily desirable from the aspect of environmental protection, but also in the sense of material savings and therefore as a permanent development and in the sense of more homogeneous materials. Furthermore, effects may be achieved with ultrafine additives which are not accessible using classical additives, because saturation is reached for the mechanical properties as a function of the concentration, which does not apply for ultrafine additives.

In addition, the size dependence of specific effects may not only be quantitative, but rather also qualitative in nature, an effect which is known from heterogeneous catalysis as "structural sensitivity." Thus, ultrafine additives usually may not unfold their full potential in polymer matrices, because they are already provided as agglomerates or agglomerate during the mixing process. The attempt to achieve the object of avoiding this set of problems is to transfer the principle of producing heterogeneous catalysts to fillers for polymers. The ultrafine particles are not applied in the mixing process, but rather to larger fillers which are contained in the polymer in any case.

The present invention also relates to the use of the particle composites as fillers for polymers or as catalysts, in particular for cross-linkable polymers, and as stabilizers in polymers.

BRIEF DESCRIPTION OF THE DRAWINGS

The present invention is explained in greater detail in FIGS. 1 and 2. Limitation is not thus intended.

DETAILED DESCRIPTION OF A PREFERRED EMBODIMENT

Figure 1:
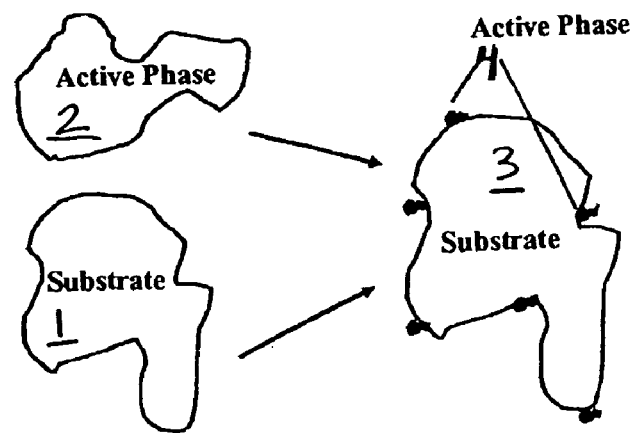
FIG. 1 shows the principle of the present invention in comparison with previously known achievements.

In FIG. 1, the classical approach is shown on the left side, while the approach according to the present invention is illustrated on the right side.

It may be seen from the left side of FIG. 1 that the particles used in the classical approach, such as filler particles 1 and particles made of active phase 2 have a significant, chemically inactive dead volume. This may be significantly reduced by fixing ultrafine particles made of active material 4 on a carrier particle 3. Fillers produced in this way already result in very good mechanical values in polymers, even after heat aging in accordance with DIN 53 508. The thermal treatment necessarily reduces the specific surface area of the carrier, however.

In order to prevent this and achieve an extraordinary stability of polymers regarding heat aging via an increased specific surface area of the filler, the carrier material may be provided with a thermolabile substance according to the method according to the present invention. A fissured or fractal surface then results during the thermal treatment, i.e., the specific surface area, and thus the activity of the filler is increased once again. A resistance to heat aging may thus be achieved, which differs significantly once again from that of a carrier-bound, but not surface-modified system.

Figure 2:
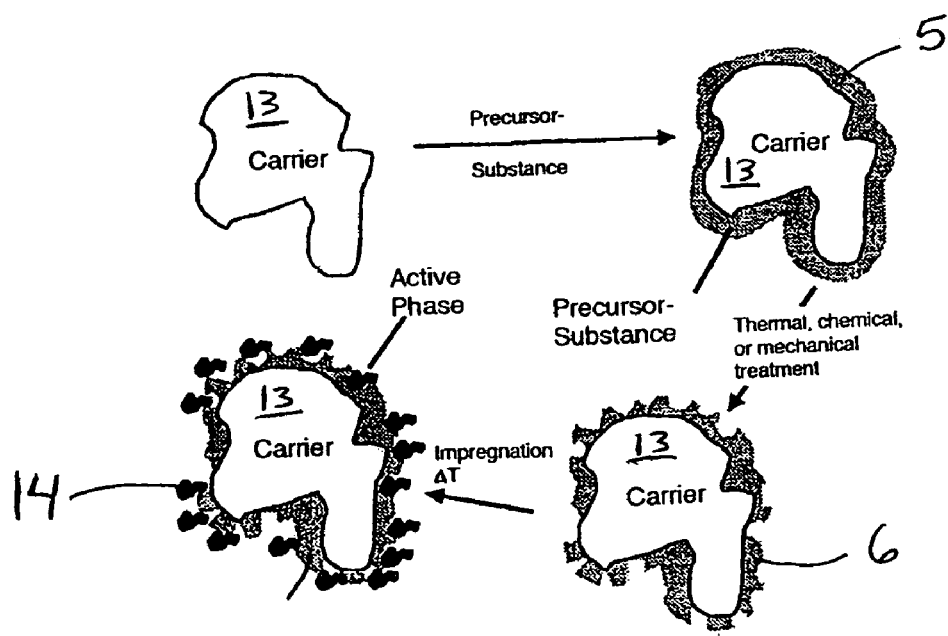
FIG. 2 shows a method for producing the particle composites according to the present invention.

An embodiment of the method according to the present invention is sketched in FIG. 2. A carrier particle 13 is combined with a thermolabile precursor substance. A layer 5 made of the thermolabile precursor substance forms on the surface of carrier particle 13. Through thermal treatment of the coated carrier particle, a layer 6 which has a strongly fissured surface arises through at least partial decomposition of the precursor substance. This is impregnated with ultrafine particles made of active material 14 and the particle composite according to the present invention thus arises.

The following example explains the present invention without limiting it.

EXAMPLE 1 AND REFERENCE EXAMPLE

Firstly, a silicic acid was impregnated with a hydrolyzed trimethoxy silane and this was thus covalently bonded to the surface of the silicic acid. A 0.9 molar zinc acetate solution was then adjusted using acetic acid to pH 4 and applied according to the "incipient wetness" method to the impregnated silicic acid, so that a computed ZnO loading of 28% resulted ("sample according to the present invention"). The paste thus obtained was dried for at least 8 hours at 100° C., subsequently dried in air at 200° C. for 12 hours, and calcinated at 250° C. for 2 hours.

Parallel to this, the same silicic acid, without previously applying a thermolabile silane, was analogously impregnated with zinc acetate and thermally treated (reference sample).

A particle composite made of silicic acid carrier material having a strongly fissured surface was obtained from the sample according to the present invention, on which zinc oxide particles were deposited. The silicic acid particles were approximately 1 μm large and the zinc oxide particles had diameters of approximately 50 nm.

In the sample according to the present invention, the specific surface area was 120 m$^2$/g, and in the reference sample it was 105 m$^2$/g, i.e., the sample according to the present invention had a specific surface area that was larger by almost 15%, at an essentially identical particle size. This was also able to be shown in electron microscope images; the sample according to the present invention had a rougher surface.

APPLICATION EXAMPLE 1

In a natural rubber-elastomer mixture, which contained 10 parts typical ZnO, 5 parts of this ZnO were taken out and in their place 5 parts of the sample according to the present invention according to example 1 and 5 parts of the reference sample were added and the elastomer compound was produced in the closed mixer, so that the net ZnO content was reduced from 10 parts to 7.5 parts, i.e., by 25%.

Using the same material, essentially identical mechanical values, such as hardness, rebound, tensile strength, elongation at tear, and compression set could be implemented with net contents of ZnO reduced by ¼ to ¹⁄₁₀.

What is claimed is:

1. A particle composite comprising:
   carrier particles having a mean diameter of less than 5 μm;
   a layer made of oxidic material having an irregular surface enveloping the carrier particles; and
   particles made of an active material having a mean diameter of less than 1 μm applied to the irregular surface.

2. The particle composite as recited in claim 1 wherein the carrier particles include carbon or oxidic carriers.

3. The particle composite as recited in claim 2 wherein the carrier particles include thermal carbon blacks or flame carbon blacks.

4. The particle composite as recited in claim 2 wherein the carrier particles include precipitated or pyrogenic silicic acids.

5. The particle composite as recited in claim 1 wherein the layer made of oxidic material contains oxides of at least one of silicon, aluminum, alkaline earth elements, alkaline elements or combinations thereof derived through thermal decomposition of at least one precursor substance having silicon, aluminum, alkaline earth elements or alkaline elements containing at least one organic residue.

6. The particle composite as recited in claim 5 wherein the at least one organic residue includes a silicon-organic compound.

7. The particle composite as recited in claim 6 wherein the silicon-organic compound includes an alkyl silane, a fluoroalkyl silane, or an alkyl silicon chloride.

8. The particle composite as recited in claim 1 wherein the active material includes a metal, metal alloy, semiconductor or compound thereof.

9. The particle composite as recited in claim 8 wherein the active material includes a chalcogenide, nitride or carbide of metals.

10. The particle composite as recited in claim 8 wherein the active substance includes an oxide.

11. The particle composite as recited in claim 10 wherein the oxide includes a zinc oxide.

12. The particle composite as recited in claim 8 wherein the metals or semiconductors are selected from a group consisting of magnesium, calcium, barium, titanium, manganese, iron, copper, zinc, silver, gold, platinum, zirconium, yttrium, aluminum, silicon, and tin.

13. The particle composite as recited in claim 1 wherein the carrier particles have a mean diameter of 0.1 μm to 1.0 μm ($D_{50}$), the particles made of active material have a mean diameter of 1 nm to 1000 nm ($D_{50}$), and a ratio of the mean diameter of the carrier particles to the mean diameter of the particles made of active material is less than 1:0.5.

14. The particle composite as recited in claim 13 wherein the ratio is between 1:0.01 and 1:0.1.

15. A filler or stablizer in polymers comprising the particle composite as recited in claim 1.

16. The filler or stablizer as recited in claim 15 wherein the polymer includes an elastomer and the active material includes zinc oxide.

17. A catalyst for chemical reactions comprising the particle composite as recited in claim 1.

18. A method for producing a particle composite comprising the steps of:
   i) producing a layer of a precursor substance having silicon, aluminum, alkaline earth elements, or alkaline elements, containing at least one organic residue, on carrier particles with a mean diameter of less than 5 μ;
   ii) thermally decomposing the precursor substance on the coated carrier particles to produce a layer enveloping the carrier particles made of oxidic material having an irregular surface; and
   iii) applying particles made of an active material having a mean diameter of less than 1 μm to the irregular surface.

19. The method as recited in claim 18 wherein the particles of the active material are applied by applying precursors of the particles made of active material to the irregular surface and thermally decomposing the particle composite.

20. The method as recited in claim 18 wherein step i) includes contact of the carrier particles with a solution or dispersion containing the precursor substance.

21. The method as recited in claim 18 wherein step i) includes making a paste of the carrier particles with a solution or dispersion containing the precursor substance.

22. The method as recited in claim 18 wherein step ii) includes selecting temperatures and treatment duration so a surface area of the enveloped carrier particle determined by a BET method has increased by at least 10% after the thermal decomposing.

23. The method as recited in claim 22 wherein the surface area has increased by at least 25% after the thermal decomposing.

24. The method as recited in claim 18 wherein step iii) includes contact of the coated carrier particles with a solution or dispersion containing particles made of active material or precursors of the particles.

25. A method for producing particle composites comprising the steps of:
   i) producing a layer of a precursor substance having silicon, aluminum, alkaline earth elements, or alkaline elements, containing at least one organic residue, on carrier particles with a mean diameter of less than 5 μm;

v) applying active particles made of an active material having a mean diameter of less than 1 μm or precursors of the active particles to the surface of the carrier particles coated with the precursor substance, and vi) thermally decomposing the precursor substance on the coated carrier particles to produce a layer enveloping the carrier particles made of oxidic material having an irregular surface, and producing particles made of active material having a mean diameter of less than 1 μm from the precursors of the active particles.

26. The method as recited in claim 25 wherein step i) includes contact of the carrier particles with a solution or dispersion containing the precursor substance.

27. The method as recited in claim 25 wherein step i) includes making a paste of the carrier particles with a solution or dispersion containing the precursor substance.

28. The method as recited in claim 25 wherein step vi) includes selecting temperatures and treatment duration so a surface area of the enveloped carrier particle determined by a BET method has increased by at least 10% after the thermal decomposing.

29. The method as recited in claim 28 wherein the surface area has increased by at least 25% after the thermal decomposing.

30. The method as recited in claim 25 wherein step v) includes contact of the coated carrier particles with a solution or dispersion containing particles made of active material or precursors of the active particles.

* * * * *